US010099255B2

(12) United States Patent
Elmquist et al.

(10) Patent No.: US 10,099,255 B2
(45) Date of Patent: Oct. 16, 2018

(54) REJECTOR DEVICE

(71) Applicant: TOMRA SORTING LIMITED, Dublin (IE)

(72) Inventors: O. Douglas Elmquist, Sacramento, CA (US); Roberto Moreno, Woodland, CA (US); Luis Moreno, Antelope, CA (US)

(73) Assignee: TOMRA SORTING LIMITED, Dublin (IE)

( * ) Notice: Subject to any disclaimer, the term of this patent is extended or adjusted under 35 U.S.C. 154(b) by 44 days.

(21) Appl. No.: 13/682,039

(22) Filed: Nov. 20, 2012

(65) Prior Publication Data

US 2013/0134014 A1 May 30, 2013

Related U.S. Application Data

(60) Provisional application No. 61/563,696, filed on Nov. 25, 2011.

(51) Int. Cl.

| | |
|---|---|
| ***B65G 47/72*** | (2006.01) |
| ***B65G 47/19*** | (2006.01) |
| ***B65G 47/52*** | (2006.01) |
| ***B07B 13/14*** | (2006.01) |
| ***B07C 5/36*** | (2006.01) |

(52) U.S. Cl.
CPC ................ *B07B 13/14* (2013.01); *B07C 5/36* (2013.01); *B07C 2501/0018* (2013.01)

(58) Field of Classification Search
None
See application file for complete search history.

(56) References Cited

U.S. PATENT DOCUMENTS

| | | | | |
|---|---|---|---|---|
| 4,031,999 A * | 6/1977 | Wagner | B65B 5/101 198/418 |
| 4,155,456 A * | 5/1979 | Garnett | B07B 13/16 209/580 |
| 4,326,425 A * | 4/1982 | Gundersen | G01N 1/20 73/863.53 |
| 7,422,114 B2 * | 9/2008 | Guptail | B03B 4/06 209/143 |
| 2007/0267279 A1 * | 11/2007 | Layne | B07C 3/08 198/890 |
| 2008/0116039 A1 * | 5/2008 | Ainsworth | B27N 3/14 198/657 |

* cited by examiner

*Primary Examiner* — Kavel Singh
(74) *Attorney, Agent, or Firm* — Leason Ellis LLP

(57) ABSTRACT

A rejector device for use within a system for sorting discrete objects, the divert device comprising at least one divert device arranged to change the trajectory of an object; and drive means arranged to drive the divert device between at least three discrete positions such that in use, at least one of said discrete objects passes along one of three paths.

14 Claims, 3 Drawing Sheets

REJECTOR DEVICE

CROSS REFERENCE TO RELATED APPLICATIONS

This application claims priority to U.S. Provisional Application No. 61/563,696 filed on Nov. 25, 2011, which is incorporated herein by reference in its entirety.

FIELD OF INVENTION

The present invention relates to automated sorting methods and systems, in particular, but not exclusively to the automated sorting of fruit and vegetables. The field of the invention also extends to, but is not limited to, methods and systems for use in waste separation, sorting and recycling, and the separation and sorting of solid granular raw materials such as mineral ores.

BACKGROUND

In certain optical-based automated sorting systems for fruit and vegetables, the product to be sorted is discharged off the end of a horizontal conveyor belt. The product to be sorted is optically scanned while on the conveyor belt and/or while in flight off the end of the belt, and an accept/reject decision is made on the basis of the scan(s). If the product is to be rejected, it will be diverted out of its normal in-flight trajectory, and deflected into a reject chute. If it is to be accepted, it will proceed along its normal in-flight trajectory uninterrupted into an accept chute. This is characteristic of a basic two-way sort operation.

In practice, more complex sort operations are often required. Products may have to be sorted into more than two categories, for example, "Class A", "Class B" and "Trash", or alternatively, "Accept", "Rework" and "Trash". Originally these more complex sort operations were achieved by passing one of the two streams from a first two-way sort through a second sorter. This required two distinct sorting systems (two optical scanners, two decision making electronics, two rejector devices, two sets of conveying systems etc). In addition to the cost associated with products undergoing two whole sorting operations, this also led to the disadvantage of additional damage to the product.

In the current state of the art as shown in FIG. 1, a single rejector device 101 is used to achieve a three-way sort by having two rejector devices 102, 103 (or two banks of such rejector devices) cascaded one after the other. A single optical scanner and decision making apparatus 104 is used to make the three-way sort decisions. As a product 110 passes the first rejector device 102, an initial sort is made wherein products classified as being of a first category—"Trash" for example—are diverted down a dedicated path 107, remaining products passing on to the second rejector device 103. As a product 110 passes the second rejector device, a second sort is made, wherein products classified as being of a second category ("Class B" for example) are diverted into a second dedicated path 108, leaving the third category of products ("Class A", for example) to pass on un-diverted to a third path 109.

Instead of needing two complete sorters, the only item that is doubled in quantity is the rejector device. However, there remain some disadvantages with this arrangement. The products must be allowed to fall through a greater height to present them to the two rejector devices in turn. This increases potential for damage to the product. Furthermore, by the time the products reach the second rejector device they have fallen a further distance so that the control and predictability of their precise position is less accurate. This reduces the accuracy of the second sorting operation by increasing the quantity of "missed sorts" (i.e. products that have been selected for diversion but which have actually been missed by the rejector device due to mistiming of the arrival of the product at the rejector device). This also reduces the accuracy of the second sorting operation by increasing the quantity of "accidental sorts" (i.e. products that have not been selected for diversion but which have actually been diverted by the rejector device due to a divert action coinciding with a mistimed arrival of the product at the rejector device). In addition to these problems, while the cost of such a device is lower than that for two complete sorters, there is still a cost associated with having two complete rejector devices. Furthermore, this arrangement is complex and therefore subject to mechanical failure.

U.S. Pat. No. 7,041,926 is directed to a method and system for separating stones of gravel aggregates by one or more predetermined characteristics. This is achieved by passing the gravel aggregate through a drop tube which runs through a plurality of junctions, each of which is connected to three exits: a first distribution hose, a second distribution hose, and a continuation of the drop tube. A pair of independently articulatable diverter devices are situated at each junction, and each pair of diverter devices is cooperatively articulatable such that only one of the three exits at a junction will be open at any given time. While this arrangement allows for complex sorting at a single point, it is still necessary to bear the cost and mechanical complexity of two rejector devices. Furthermore, this arrangement requires coordination of the movement of both independently articulatable diverter devices, adding to the complexity of the overall system.

Accordingly, there is a need for improved methods and systems of automatically sorting into multiple classes.

SUMMARY OF THE INVENTION

According to the present invention there is provided a rejector device for use within a system for sorting discrete objects, the rejector device comprising at least one divert device arranged to change the trajectory of an object; and drive means arranged to drive the divert device between at least three discrete positions such that in use, at least one of said discrete objects passes along one of three paths.

Preferably the at least one divert device is arranged to contact said at least one object when in at least two of said at least three discrete positions.

The rejector device may be configured to sort objects while said objects are falling.

Preferably the at least one divert device comprises a paddle.

In an alternative embodiment the at least one divert device may comprise a flexible chute having an input and a moveable output drivable between said at least three discrete positions.

The drive means may comprise a three position pneumatic cylinder. This is advantageous because it is comparatively mechanically simple as compared to alternative drive means. The drive means may alternatively comprise an electric motor.

The present invention further provides a rejector array comprising a plurality of rejector devices as defined above. Preferably the each rejector device is independently actuateable.

The present invention further provides a sorting system comprising at least one rejector device as described above.

The diverter device of said at least one rejector device may be arranged in at least two of the at least three positions to divert an object into respective reject paths.

The present invention further provides a method of sorting discrete objects comprising the steps of i) positioning a divert device in one of three discrete positions; and ii) varying the trajectory of at least one of said discrete objects when said divert device is positioned in two of said three discrete positions.

Step ii) may comprise diverting said discrete object by said divert device.

Step ii) preferably comprises varying the trajectory of at least one of said discrete objects when said at least one discrete object is falling.

Preferably step ii) comprises varying the trajectory of at least one of said discrete objects into one of two respective reject paths.

The method may further comprise changing the position of the divert device between two of said three discrete positions between the passage of successive discrete objects.

BRIEF DESCRIPTION OF THE INVENTION

DETAILED DESCRIPTION

Figure 1:
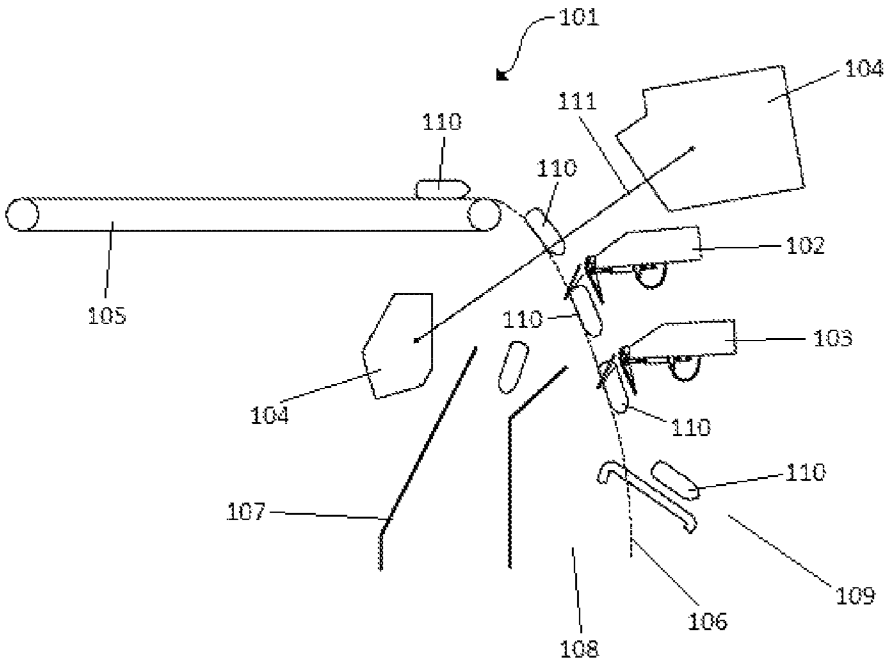
FIG. 1 is a side view depiction of a three-way sorting system utilising two successive two-way rejector devices in accordance with an embodiment of the prior art.

As described above, FIG. 1 depicts a three-way sorting system 101 in accordance with a prior art system. This system for sorting objects 110 comprises a conveyor 105, an optical apparatus 104, a pair of two-way rejector devices 102, 103 and three mutually exclusive paths 107, 108 and 109. Objects to be sorted 110 are borne along conveyor 105 and allowed to fall off the end of the conveyor 105 where they enter freefall. Because mass of all given objects to be sorted typically follows a known distribution, and because the conveyor is operated at a predetermined speed, it is possible to estimate the trajectory 106 of the objects once they enter freefall. Paths 107, 108 and 109 are arranged below the conveyor such that an undiverted freefalling object will proceed along path 109, whereas diversion of a freefalling object will either proceed along path 107 or 108, depending on the extent to which it is diverted.

Optical apparatus 104, having a field of vision 111, is positioned along the estimated trajectory 106 such that freefalling objects will first pass through the field of vision 111. Optical apparatus 104 may scan an object that passes through the field of vision 111, and make a determination in real time as to whether the scanned object should be sorted into path 107, 108 or 109. Optical apparatus 104 may then pass on the relevant instructions to rejector devices 102, 103 to ensure that the scanned object is sorted into the determined path. Rejector devices 102, 103 ensure that the scanned object is sorted accordingly as will be described below.

Further along the estimated trajectory 106 (i.e. after the optical apparatus), first two-way rejector device 102 is situated such that when in the retracted position, an object in freefall will pass by the device 102, its trajectory undiverted and proceeding in the direction of path 109. When extended at the appropriate time during the freefall of an object, rejector device 102 will divert the trajectory of the object such that it proceeds along path 107. Instructions from the optical apparatus 104 determining that the object is to be sorted along path 107 will cause the rejector device to extend at a time appropriate to ensure that the object will proceed along path 107. If optical apparatus determines that the object is to proceed along path 108 or 109, this will cause rejector device to remain retracted. Just as the trajectory of the objects in freefall may be estimated, so too may the position of the object along this estimated trajectory at a given point in time. As such, it is possible to estimate when first two-way rejector device should extend to ensure an object is diverted along path 107.

Even further along the estimated trajectory 106 (i.e. after the optical apparatus and the first rejector device) second two-way rejector device 103 is situated. Only objects which have passed by the first rejector device undiverted (i.e. which are still proceeding in the direction of path 109 and were not diverted along path 107) will have their trajectories divertable by the second rejector device. When second rejector device is in the retracted position, a divertable object passing by the device 103, will pass with its trajectory undiverted and will proceed along path 109. When extended at the appropriate time during the freefall of such an object, rejector device 103 will divert the trajectory of the object such that it proceeds along path 108. As with first rejector device 102, optical apparatus 104 will send instructions to rejector device 103 if a freefalling object is to be diverted along path 108, in which case rejector device 103 will extend at the appropriate time.

As such, this prior art three-way sort system achieves a three-way sort capability by arranging a cascaded pair of two-way rejector devices 102, 103 along the freefall trajectory of objects 110 that fall off the end of conveyor 105.

Figure 2:
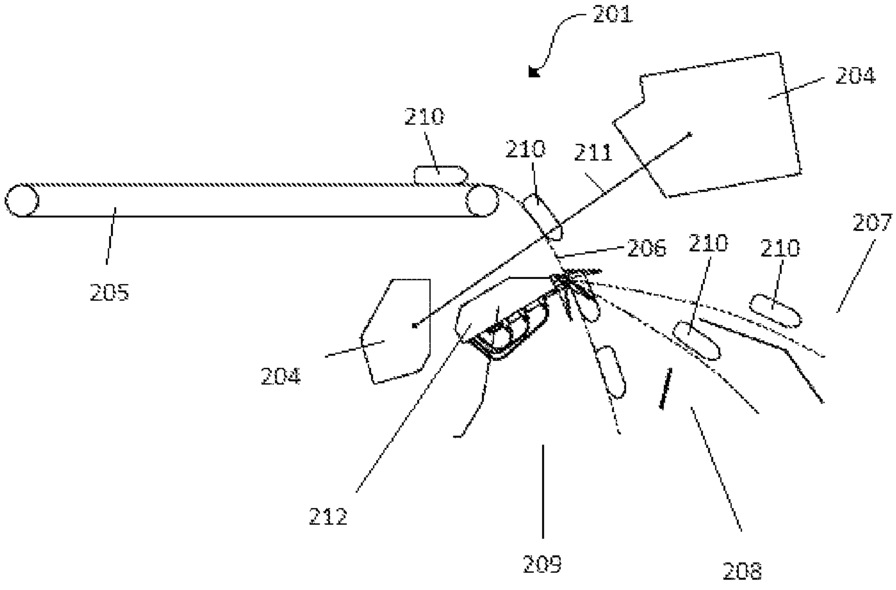
FIG. 2 is a side view depiction of a three-way sorting system utilising a single three-way rejector device in accordance with an embodiment of the present invention.

Referring now to an embodiment of the invention, FIG. 2 depicts a three-way sorting system 201 for sorting objects 210 comprising a conveyor 205, an optical apparatus 204, a single three-way rejector device 212 and three mutually exclusive paths 207, 208 and 209. As with the system of FIG. 1, objects to be sorted 210 are borne along conveyor 205 and allowed to fall off the end of the conveyor 205 where they enter freefall. As previously described, the trajectory 206 of freefalling objects may be estimated. Paths 207, 208 and 209 are arranged below the conveyor such that an undiverted freefalling object will proceed along path 209, whereas diversion of a freefalling object will either proceed along path 207 or 208, depending on the extent to which it is diverted.

Optical apparatus 204 is positioned along the estimated trajectory 206 and configured in a manner analogous to the optical apparatus 104 of system 101 such that freefalling objects will first pass through the field of vision 211 of optical apparatus 204 where they may be scanned. A determination may then be made in real time as to whether a scanned object should be sorted into path 207, 208 or 209, and relevant instructions may then be relayed to three-way rejector device 212 to ensure that the scanned object is sorted into the determined path. Three-way rejector device 212, may be maintained in a retracted position or extended to one of two different extended positions—a "mid" extended position and a "full" extended position. Three-way rejector device 212 ensures that the scanned object is sorted accordingly, as will be described in greater detail with reference to FIGS. 3, 4, 5 and 6.

Three-way rejector device 212 is located along the estimated trajectory 206 such that it is located further along the trajectory than the optical apparatus 204). The device 212 is positioned such that when the device 212 is in the retracted position, an object in freefall will pass by the device 212, following an undiverted trajectory. Additionally, device 212 is positioned such that when the device 212 is in the "mid" or "full" extended positions, an object in freefall will be diverted out of its normal trajectory. When extended to the "mid" position at the appropriate time during the freefall of an object, three-way rejector device 212 will divert the trajectory of the object such that it proceeds along path 208. When extended to the "full" position at the appropriate time during the freefall of an object, three-way rejector device 212 will divert the trajectory of the object such that it proceeds along path 207. Instructions from the optical apparatus 204 determining that the object is to be sorted along path 208 or 207 will cause the rejector device to extend to the "mid" and "full" positions respectively at a time appropriate to ensure that the object will proceed along path 208 or 207 as designated. If optical apparatus determines that the object is to proceed along path 209, this will cause rejector device 212 to remain retracted.

Figure 3:
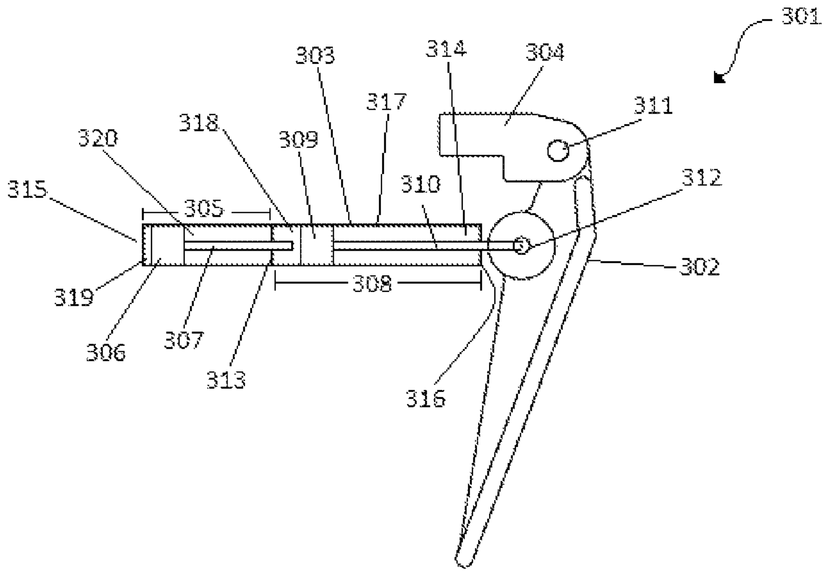
FIG. 3 is a side view depiction of the three-way rejector device of an embodiment of the present invention in a fully retracted position.

FIG. 3 depicts a rejector device 301 in accordance with one embodiment of the invention. Rejector device 301 comprises a paddle mounting portion 304, a diverting paddle 302, a three position pneumatic cylinder 303 and a main body (not shown). The diverting paddle 302 is pivotally attached along one of its ends to the paddle mounting portion 304. The paddle mounting portion 304 is held static by the main body (not shown) such that the diverting paddle 302 may pivot about its pivot point 311 relative to the paddle mounting portion 304 and the main body. The paddle mounting portion 304 may be attached to or be an integral part of the main body of the rejector device.

The three position pneumatic cylinder 303 comprises a cylinder housing 317, a front end 316, and a rear end 315. The cylinder housing 317 is mounted to the main body of the rejector device 301. The pneumatic cylinder further comprises a rear chamber 305 located adjacent the rear end 316 and a front chamber 308 located adjacent the front end 316, the individual chambers 305, 308 formed by a partition wall 313 within the cylinder 303.

The front chamber 308 of the three position cylinder 303 houses a front piston 309 from which a first end of a front piston rod 310 extends. A second end of the front piston rod 310 extends through an aperture in the cylinder housing 317 and is rotatably connected to the diverting paddle 302 at a connection point 312. Movement of the front piston 310 towards cylinder end 316 thus effects a translation of the paddle 302 away from the cylinder end 316. Front piston 309 is situated within front chamber 308 such that it defines a first front chamber section 318 and a second front chamber section 314. First front chamber section 318 is connected to a source of air pressure operated by a first valve (not shown). A constant return force is maintained in second front chamber section 314 to bias front piston 309 against partition wall 313. This return force is applied by a constant air pressure connection to the second front chamber section 314. The air pressure supplied to the second front chamber section 314 is less than the air pressure applied to the front chamber section 318 when the first valve is in the open position. When the front piston 309 is proximate to the partition wall 313, the front piston 309 is in a fully retracted state.

The rear chamber 305 of the three position cylinder 303 houses a rear piston 306 and rear piston rod 307 arrangement. The rear chamber 305 and rear piston 306 have a shorter stroke than the stroke of forward chamber 308 and forward piston 309. The partition wall 313 comprises an aperture through which rear piston rod 307 may extend. An airtight seal is provided around rear piston rod 307 by the aperture in the partition wall 313. Rear piston 306 is situated within rear chamber 305 such that it defines a first rear chamber section 319 and a second rear chamber section 320. First rear chamber section 319 is connected to a source of air pressure operated by a second valve (not shown).

By controlling pressures within front chamber sections 314 and 318, it is possible to move front piston 309 between a fully retracted state, a mid extended state and a fully extended state. The front piston 309 is in a fully extended state when positioned against the front wall 316. The rear piston is in a fully extended state when positioned against partition wall 313. It will be appreciated when the rear position is fully extended, the free end of the rear piston rod 307 protrudes into the first front chamber section 318. The length of the rear piston rod 307 is such that when the rear piston 306 is in a fully extended state, rear piston rod 307 can act upon front piston 309 to push it to an intermediate point between the front end of the cylinder 316 and the partition wall 313. In this case, the front piston 309 is neither fully retracted nor fully extended, but in a "mid" extended state. When the first valve prevents air pressure from being applied to first front chamber section 318, the return force of the constant air pressure in second front chamber section 318 cushions against further movement of the front piston 309 into its fully extended state.

As depicted in FIG. 3, the rejector device 301 is in the retracted position. The second valve is operated to prevent air pressure from being applied to first rear chamber section 319, and air present there is exhausted out of the cylinder 303. The first valve is operated to prevent air pressure from being applied to the first front chamber section 318, and air present there is exhausted out of the cylinder 303. The return force in the second front chamber section 314 pushes the front piston 309 and consequently the rear piston 306 to their retracted states. As a result, front piston rod 310 translates paddle 302 into a fully retracted state. As such, the rejector device 301 is in a fully retracted position. A fully-retracted rejector device located within a three way sorting system in accordance with FIG. 2 will allow objects 110 to fall freely off the conveyor, unaffected by the paddle and along path 209.

Figure 4:
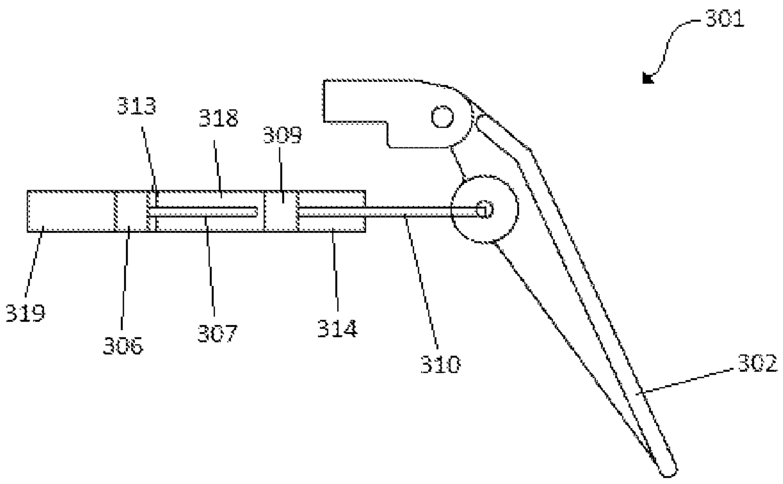
FIG. 4 is a side view depiction of the three-way rejector device of an embodiment of the present invention in a semi-extended, or "mid", position.

As depicted in FIG. 4, the rejector device 301 is in the mid extended position. The second valve is operated to apply air pressure to the first rear chamber section 319, translating the rear piston 306 to its extended state. The first valve is operated to prevent air pressure from being applied to the first front chamber section 318, and air present there is exhausted out of the cylinder 303. The return force in the second front chamber section 314 pushes the front piston 309 toward the partition wall 313 until it comes to rest against rear piston rod 307. The force imparted by the air pressure applied to first rear chamber section 319 is greater than the return force in second front chamber section 314. Accordingly, rear piston 306 remains in its fully extended state, and front piston 309 therefore is retained in a mid extended state. As a result, front piston rod 310 translates paddle 302 into a mid extended state. As such, the rejector device 301 is in a mid extended position. When a rejector device 301 located within a three way sorting system in accordance with FIG. 2 is in a mid extended position, objects 110 falling off the conveyor 205 will roll or slide down the paddle 302 and along path 208. In the preferred embodiment of the invention, the mid extended position is the default position of the rejector device.

Figure 5:
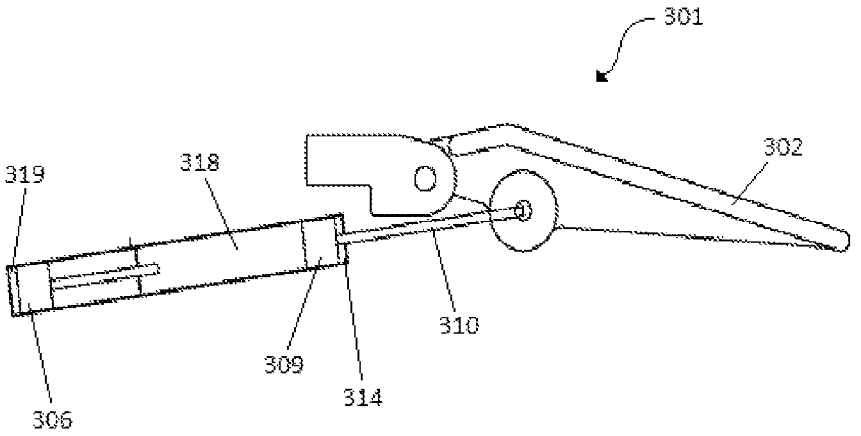
FIG. 5 is a side view depiction of the three-way rejector device of an embodiment of the present invention in a fully extended position.

As depicted in FIG. 5, the rejector device 301 is in the fully extended position. The first valve is operated to apply air pressure to the first front chamber section 318. The force imparted by the air pressure applied to first front chamber section 318 is greater than the return force in the second front chamber section 314. Accordingly, the front piston 309 is translated to its extended state. As a result, front piston rod 310 translates the paddle 302 to a fully extended state. As such, the rejector device 301 is in a fully extended position. In a sorting system in accordance with FIG. 2, objects 110 sliding down the face of a divert paddle 302 in a mid extended position will be flicked out along path 207 if the rejector device is transitioned to the fully extended position at that moment.

It is to be noted that in FIG. 5 that second valve is operated to prevent air pressure from being applied to first rear chamber section 319, and the rear piston 306 is not in its extended state. When the front piston 309 is in its fully extended state, this has no material effect on the position of the rejector device 301.

Figure 6:
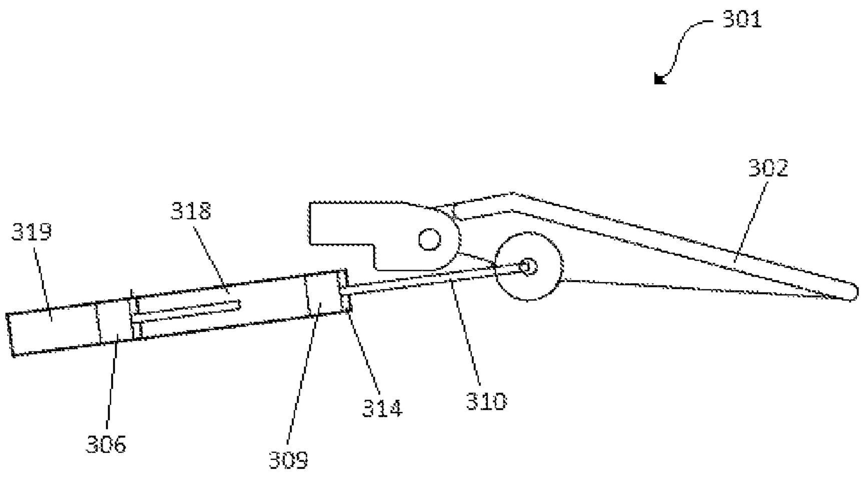
FIG. 6 is a side view depiction of the three-way rejector device of an embodiment of the present invention in the fully extended position wherein the three-position cylinder is in an alternative state to that depicted in FIG. 5.

FIG. 6 is an alternative configuration of the rejector device 301 in its fully extended position, where the only difference with the configuration of FIG. 5 is that the rear piston 306 is also in its extended state. As can be seen, this does not impact the position of the rejector device 301, which remains—as in FIG. 5—in its extended state.

While the rejector device 301 comprises a diverting paddle 302, alternative embodiments of the invention may comprise alternatives to a diverting paddle that would equally function as a diverting means. Such alternatives include, but are not limited to, a diverting finger or a flexible diverting chute having a fixed ingress, and an articulatable egress.

Equally, while the rejector device 301 comprises a three position pneumatic cylinder, alternative embodiments of the invention may comprise alternatives to a three position cylinder that would equally function as the drive means for articulating the diverting device. Such an alternative arrangement may comprise a pair of single piston cylinders positioned back to back (commonly known as a four position cylinder). In such an alternative, the protruding end of the piston rod of one cylinder may be rotatably attached to the diverting means and the protruding end of the piston rod of the other cylinder may be attached to the main body of the rejector device. Another alternative comprises a pair of cylinders of different strokes positioned side by side, such that the piston rods of both cylinders come into contact with (but are not affixed to) the diverting means. A further alternative drive means comprises an electric motor configured to articulate the diverting means between retracted, "mid" extended, and fully extended positions. It will be appreciated that these alternative drive means are meant by way of example, and are not intended to limit the scope of the invention.

Furthermore, while the return force in second front chamber section 314 is characterised as being imparted by a constant air pressure connection biasing the front piston 309 toward the partition wall 313, alternative embodiments of the invention may comprise alternative arrangements. For example, the return force may be imparted by a helical spring positioned within the second front chamber section 314. In an alternative, the return force may be imparted by a leaf spring integrated into the diverter paddle 302, and biased toward the retracted position. It will be appreciated that these alternative means of delivering a return force are meant by way of example, and are not intended to limit the scope of the invention.

Further embodiments of this invention comprise a rejector device configured to articulate between more than 3 positions. This could be achieved, by replacing the three position cylinder with a four-position cylinder comprising two back-to-back single-piston cylinders of different strokes. However, further implementations of such embodiments of the invention are also envisaged.

Where a sorting system such as that depicted in FIG. 2 comprises a conveyor 205 of a given width, an array of rejector devices may be positioned side by side across the width of the conveyor. In this arrangement an object borne off the end of the conveyor will enter freefall at a given point across the conveyor's width. The relevant one or more rejector devices corresponding to this given point across the conveyor's width may then be actuated to divert the object as required. In this way, multiple objects may be sorted concurrently as they are borne of the end of the conveyor at the same time at different points across the conveyor's width, and diverted by the corresponding one or more diverter devices as appropriate.

While the sorting system of FIG. 2 comprises an optical apparatus 204 for scanning the objects to be sorted, the present invention is not limited to scanning using the visible component of the electromagnetic spectrum. Alternative embodiments of the invention contemplate alternative scanning means. In one alternative, the scanning means may comprise an infrared scanner, and in another alternative the scanning means may comprise an x-ray scanner. Other scanning means are also contemplated, including, but not limited to scanning means that use other components of the electromagnetic spectrum. Furthermore, while the optical apparatus 204 of FIG. 2 is depicted as scanning the objects to be sorted when in freefall, in alternative embodiments of the invention, the scanning means may also or alternatively scan objects before they enter freefall. For example, in embodiments of the invention comprising a conveyor, the objects may also or alternatively be scanned while still on the conveyor.

While the sorting system of FIG. 2 has been depicted as having a substantially or completely horizontally oriented conveyor, alternative embodiments of the invention are contemplated wherein the conveyor is not substantially or completely horizontal. In such embodiments, surface irregularities extending across the width of the conveyor may retain the objects to be sorted in a substantially static position as they are borne along the conveyor.

Furthermore, while the sorting system of FIG. 2 is depicted comprising a conveyor 205 such that objects to be sorted enter freefall as they are launched from the end of the conveyor, alternative launching means are contemplated in alternative embodiments of the invention. In one alternative, the launching means comprises a vibratory feed. In another alternative, the launching means comprises a slide chute. In a further alternative, the launching means comprises a fluidized bed. Additional alternative launching means are also contemplated.

What has been described herein includes examples of one or more aspects. It is, of course, not possible to describe every conceivable combination of components or methodologies for the purposes of describing the aforementioned aspects. A person of ordinary skill in the art will recognize that many further combinations and permutations of various aspects are possible. Accordingly, the described aspects are intended to embrace all such alterations, modifications and variations that fall within the spirit and scope of the appended claims. Furthermore, to the extent that the terms "includes" or "including" or any variation thereof is employed in either the detailed description or the claims, such term is intended to be inclusive in a manner similar to the term "comprising" as "comprising" is interpreted when employed as a transitional word in a claim.

The invention claimed is:

1. A rejector device for use within a system for sorting discrete falling objects, the rejector device comprising:

at least one diverting paddle configured to move between at least three discrete positions and arranged to change a falling path of a falling object, wherein the at least one diverting paddle comprises an exterior surface that is arranged to contact the falling object when the at least one diverting paddle is in a first position and a second position of the three discrete positions and alter the falling path of the falling object, and the at least three discrete positions further comprising, a third discrete position in which a falling object will not contact the at least one diverting paddle, and a drive configured to move the at least one diverting paddle between the at least three discrete positions.

2. The rejector device of claim 1 wherein the drive comprises a three position pneumatic cylinder comprising a piston rod that is connected at an end thereof to the at least one diverting paddle, and wherein the three positions of the pneumatic cylinder correspond to the first second and third positions of the at least one diverting paddle, respectively.

3. The rejector device of claim 1 wherein the drive comprises an electric motor.

4. The rejector device of claim 1, wherein the at least one diverting paddle is arranged to, when moved into a respective position among the first and second positions, position the exterior surface within the falling path at a respective angle such that the falling object contacting the exterior surface deflects off of the exterior surface and continues falling along a respective reject falling path.

5. The rejector device of claim 4, wherein the at least one diverting paddle is pivotally attached to a body, and wherein the at least one diverting paddle is configured to move between the at least three discrete positions about the pivotal attachment.

6. A rejector array, comprising:

a plurality of rejector devices, each comprising:

a diverting paddle pivotally attached to a structural body, wherein the diverting paddle is configured to pivotally move between at least three discrete positions and arranged to change a falling path of a falling objet, wherein the diverting paddle comprises:

an exterior surface that is arranged to contact the falling object in a first and a second position among the at least three discrete positions and alter the falling path of the falling object, and wherein the exterior surface is configured to not contact the falling object when the diverting paddle is in a third position of the at least three discrete positions, and a drive configured to controllably move the diverting paddle between the at least three discrete positions, and wherein the drive is configured to, in response to instructions identifying a determined falling path for the falling object received from a scanning device, move the diverting paddle into one of the at least three discrete positions that corresponds to the determined falling path.

7. The rejector array of claim 6 wherein each of said plurality of rejector devices are independently actuateable in response to in response to the instructions received from the scanning device.

8. A sorting system comprising:

at least one rejector device comprising:

a diverting paddle pivotally mounted to a body, wherein the diverting paddle is configured to move about a pivot point between at least three discrete positions, wherein the at least one diverting paddle comprises an exterior surface that is arranged to contact the falling object in a first and a second position of the three discrete positions and alter the falling path of the falling object, and wherein the diverting paddle is configured to not contact the falling object in a third position of the three discrete positions, and a drive configured to controllably move the diverting paddle between the at least three discrete positions, wherein the drive is configured to, according to instructions received from a scanning apparatus and identifying a determined falling path, move the diverting paddle into one of the at least three discrete positions that corresponds to the determined falling path.

9. The sorting system of claim 8 wherein the diverting paddle of said at least one rejector device is arranged to, when in the first and second positions, position the exterior surface within the falling path at a respective angle such that the falling object contacts the exterior surface and rolls or slides down the exterior surface and is thereby diverted from a first falling path into a respective reject falling path.

10. The sorting system of claim 8 further comprising:

a scanning apparatus positioned along an estimated falling path of falling objects such that the falling objects will pass through a field of view of the scanning apparatus, and wherein the scanning apparatus is configured to determine the respective reject falling path for the falling object and relay instructions to at least one of a plurality of rejector devices; and a plurality of rejector devices, wherein the plurality of rejector devices are positioned relative to the scanning apparatus such that the falling objects first pass through the field of view of the scanning apparatus.

11. A method of sorting discrete falling objects comprising the steps of:

i) positioning a diverting paddle in one of three discrete positions using a drive means, wherein the diverting paddle comprises an exterior surface that is arranged to, when the diverting paddle is in a first and a second position among the three discrete positions, contact discrete falling objects and thereby alter a respective falling path of the falling objects; and ii) varying a falling path of at least one of said discrete falling objects while the at least one object continues falling when said paddle is positioned in either of the first and the second positions; wherein step ii) comprises contacting the at least one falling object with the exterior surface of the paddle and causing the at least one falling object to deflect off of the exterior surface and continue falling along a different falling path; and wherein a third of the three discrete positions comprises a discrete position in which a falling object will not be diverted by the paddle.

12. The method of claim 11, further comprising:

determining, with a scanning apparatus positioned along an estimated falling path of the discrete falling objects, a respective reject falling path for the at least one falling object; and wherein the step i) comprises: positioning, using the drive means according to the respective reject falling path, the diverting paddle at one of the first and second positions that corresponds to the respective reject path, wherein, in the one of the first and second positions, the exterior surface is arranged to intersect the falling path of the at least one falling object at a respective angle, and wherein the step ii) comprises: contacting the at least one falling object with the exterior surface having the respective angle such that the at least one falling object deflects off of the exterior surface and thereby diverting said discrete falling object into the respective reject falling path.

13. The method of claim 11 wherein step ii) comprises varying the falling path of at least one of said discrete falling objects into one of two respective reject paths.

14. The method of claim 11 further comprising changing the position of the paddle between two of said three discrete positions between the passage of successive discrete falling objects.

* * * * *